T. WOEHR.
COASTER VEHICLE.
APPLICATION FILED JUNE 18, 1921.
1,428,735.
Patented Sept. 12, 1922.
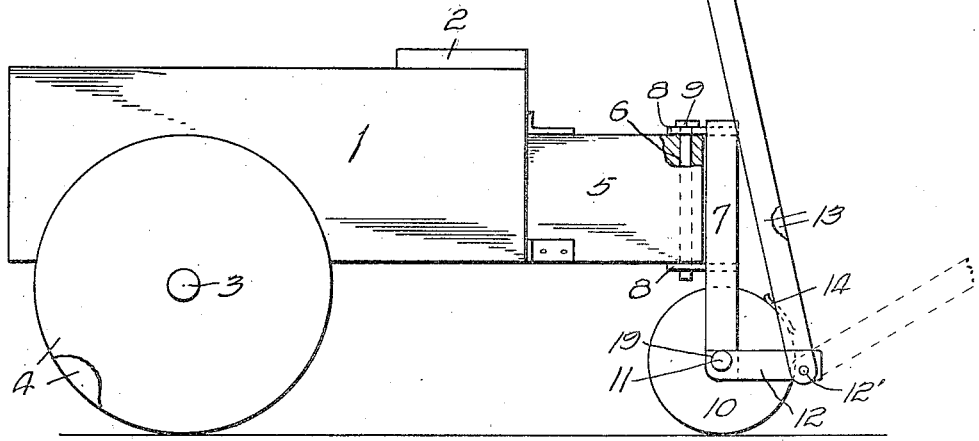
Fig. 1.
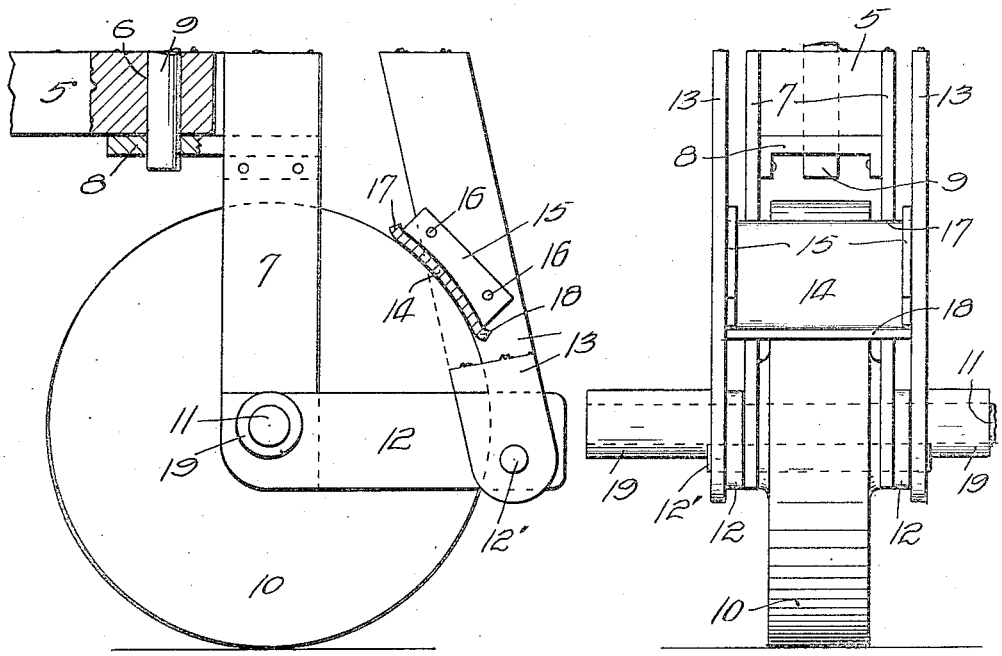
Fig. 2.
Fig. 3.
Inventor.
Theodor Woehr.
By
Attorney.

Patented Sept. 12, 1922.

1,428,735

UNITED STATES PATENT OFFICE.

THEODOR WOEHR, OF ST. LOUIS, MISSOURI.

COASTER VEHICLE.

Application filed June 18, 1921. Serial No. 478,520.

*To all whom it may concern:*

Be it known that I, THEODOR WOEHR, a citizen of the United States, residing in the city of St. Louis and State of Missouri, have invented certain new and useful Improvements in Coaster Vehicles, of which the following is a specification.

My invention relates to coaster vehicles, and, has for its object to provide a simple brake therefor controlled by the operator through the steering means or tongue, thus eliminating the necessity of dragging the feet upon the ground.

A further object of the invention is to provide a combined brake and tongue which is a distinct and practical improvement to overcome certain practical objections to, and defects in, the brakes now employed in the construction of coaster vehicles.

With the above and other objects in view, the invention consists in the novel features of construction, arrangement and combination of parts hereinafter more fully described and finally pointed out in the claim hereto appended.

Referring to the accompanying drawings forming a part of this specification wherein like characters of reference denote similar parts throughout the several views:

Fig. 1, is a side elevation of my improved coaster vehicle showing the brake applied to the front wheel.

Fig. 2, is a detail of the steering mechanism showing the brake applied to the front wheel.

Fig. 3, is a front elevation of the steering mechanism and the brake.

In carrying out the aim of my present invention, I employ a suitable vehicle body 1 having a suitable seat 2. The body 1 is suitably fixed to the rear axle 3 which is provided with a pair of supporting wheels 4.

5 indicates a suitable body extension provided at its forward end with a vertical passage 6.

plied and highly efficient for the purpose front wheel supporting members located in advance of the extension 5 and provided with a pair of rearwardly extending ears 8 between which is received the forward end of the extension 5. These ears are pivotally connected to the forward end of the extension 5 by means of a suitable pin 9 passing through registered openings in the ears 8 and the passage 6 of the extension 5. This arrangement permits the front wheel supporting members, which act as a fork, to be moved in an arcuate path. The members 7 extend below the lower plane of the extension 5 and are spaced apart so as to provide a working space for the reception of a steering, or front wheel 10. The front wheel 10 is rotatably mounted upon the axle 11 which is supported by the vertically disposed supporting members 7.

A pair of suitable arms 12 are suitably fixed to, and extend forwardly from, the axle 11 to a point just beyond the periphery of the front wheel 10. Pivotally connected to the forward end of the arms 12 by means of the pin 12' is a steering handle, or tongue which comprises a pair of spaced, preferably strap iron, members 13 so that the front wheel 10 may enter between the two members 13, as shown in Fig. 2. 14 indicates a brake plate, preferably metallic, which has its side edges 15 preferably bent at an angle to the plate 14 for fixed connection to the tongue members 13 by means of suitable fasteners 16. The brake plate 14 has a concaved inner face to provide a braking surface for contact with the periphery of the front wheel when it is brought into frictional contact with the front wheel and its upper and lower ends are curved forwardly away from the front wheel, as at 17 and 18, respectively. The pivot point 12' for the steering tongue members 13 is preferably at a point below the front axle 11, or horizontal axis of the wheel, as clearly shown in Fig. 2.

When the brake is applied, it will be observed, that the plate 14 engages the periphery of the front wheel 10, preferably above the center thereof and in front of the front wheel supporting arms 7.

The axle 11 which extends beyond each of the arms 12 is provided with suitable coverings to provide foot rests 19, on each side of the steering wheel 10, as clearly shown in Fig. 3.

20 indicates a suitable transverse handle fixed to and extending from the sides of the members 7 and used as a handle to assist the feet in steering the device, or pulling the device when it is not used as a coaster.

It is evident that a person sitting upon the seat 2 places his or her feet upon the foot rests 20, and, guides the vehicle through the medium of the hands and feet both, or either alone if desired.

Should the operator desire to stop the vehicle, the handle 21 at the upper end of the tongue 13 is pulled rearwardly thereby moving the tongue into a rearwardly inclined position and bringing the brake plate 14 into contact with the forward periphery of the steering wheel 10 which will stop the vehicle gradually, or suddenly owing to the pulling pressure brought to bear upon the brake plate through the tongue 13.

From the foregoing description, it is evident that I provide a brake for coasters which is simple in construction, easily applied and highly efficient for the purpose intended.

The many advantages of the herein described invention will readily suggest themselves to those skilled in the art to which it appertains.

I do not desire to be understood as limiting myself to the exact details of construction and arrangement as herein described and illustrated, as it is manifest that variations and modifications may be made without departing from the spirit and scope of my invention and the terms of the following claim, hence I wish it to be understood that I reserve the right to make any such changes, or modifications as may fairly fall within the scope of the appended claim when fairly construed.

What I claim is:

In a vehicle steering mechanism comprising in combination with a body, a forked member pivotally connected to the forward end of said body, an axle supported by said forked member, a steering wheel rotatably supported by said axle, a pair of arms fixed to said axle and directed forward therefrom, a tongue pivotally connected to said arms in advance of the steering wheel and a brake shoe fixed to said tongue and movable thereby into contact with the forward periphery of the steering wheel for controlling the rolling movement of said wheel.

In testimony whereof, I have hereunto signed my name to the specification.

THEODOR WOEHR.